(12) United States Patent
Benslimane

(10) Patent No.: US 11,656,141 B2
(45) Date of Patent: May 23, 2023

(54) PRESSURE SENSOR ARRANGEMENT

(71) Applicant: Danfoss A/S, Nordborg (DK)

(72) Inventor: Mohamed Benslimane, Nordborg (DK)

(73) Assignee: Danfoss A/S, Nordborg (DK)

(*) Notice: Subject to any disclaimer, the term of this patent is extended or adjusted under 35 U.S.C. 154(b) by 0 days.

(21) Appl. No.: 16/973,869

(22) PCT Filed: Jun. 11, 2019

(86) PCT No.: PCT/EP2019/065117
§ 371 (c)(1),
(2) Date: Dec. 10, 2020

(87) PCT Pub. No.: WO2019/238627
PCT Pub. Date: Dec. 19, 2019

(65) Prior Publication Data
US 2021/0247258 A1 Aug. 12, 2021

(30) Foreign Application Priority Data
Jun. 13, 2018 (DE) .................. 102018114077.0

(51) Int. Cl.
*G01L 19/06* (2006.01)
*G01L 9/00* (2006.01)
*G01L 19/00* (2006.01)

(52) U.S. Cl.
CPC ........ *G01L 19/0609* (2013.01); *G01L 9/0052* (2013.01); *G01L 19/0038* (2013.01)

(58) Field of Classification Search
CPC ............. G01L 19/0038; G01L 19/0609; G01L 19/0645; G01L 9/0052
(Continued)

(56) References Cited

U.S. PATENT DOCUMENTS 4,732,042 A   3/1988 Adams
4,884,451 A  12/1989 Schulze
(Continued)

FOREIGN PATENT DOCUMENTS

CN   101553719 A1  10/2009
CN   105829850 A    8/2016
(Continued)

OTHER PUBLICATIONS

Ponte, Elizabeth. "Shore Hardness and Soft Tpes." Shore Hardness Chart—Measuring Hardness of Thermoplastic Elastomers, https://www.teknorapex.com/thermoplastic-elastomers-and-measuring-shore-hardness-chart#.*
(Continued)

*Primary Examiner* — David Z Huang
*Assistant Examiner* — Jean F Morello
(74) *Attorney, Agent, or Firm* — McCormick, Paulding & Huber PLLC

(57) ABSTRACT

A pressure sensor arrangement (1) for measuring a pressure of a fluid is described, the sensor arrangement (1) comprising a connector housing (2) having a fluid opening (3) and a fluid chamber (4) in connection with the fluid opening (3), at least one pressure sensitive element (5), a membrane (9) arranged between the pressure sensitive element (5) and the fluid chamber (4), and pressure attenuation means (10). Such a pressure sensor arrangement should be able to protect the measuring membrane from high frequency pressure pulsations with low costs. To this end the pressure attenuation means (10) are arranged in the fluid chamber (4) in direct contact with the membrane (9) separating the membrane (9) from the fluid in the fluid chamber and comprise a homogenous incompressible material having a mechanical loss factor of 0.1 or higher at frequencies of 200 Hz or higher.

19 Claims, 2 Drawing Sheets

(58) Field of Classification Search
USPC .......................................................... 73/707
See application file for complete search history.

(56) References Cited

U.S. PATENT DOCUMENTS

| | | | |
|---|---|---|---|
| 6,117,086 A * | 9/2000 | Shulze | A61B 5/03 |
| | | | 73/706 |
| 6,732,590 B1 * | 5/2004 | Gottlieb | B60C 23/0408 |
| | | | 73/754 |
| 8,117,920 B2 | 2/2012 | Volger | |
| 8,820,168 B2 | 9/2014 | Lux et al. | |
| 2002/0033050 A1 * | 3/2002 | Shibata | G01L 19/141 |
| | | | 73/754 |
| 2016/0075857 A1 * | 3/2016 | Funderburg | C07C 69/75 |
| | | | 524/569 |
| 2016/0084726 A1 | 3/2016 | Woersinger et al. | |
| 2017/0016790 A1 | 1/2017 | Van Der Wiel | |

FOREIGN PATENT DOCUMENTS

| | | |
|---|---|---|
| CN | 107003197 A | 8/2017 |
| CN | 107543646 A | 1/2018 |
| CN | 207081503 U | 3/2018 |
| DE | 3713236 A1 | 11/1988 |
| DE | 10 2008 026 611 A1 | 12/2009 |
| DE | 10 2008 043 323 A1 | 5/2010 |
| EP | 2 659 248 B1 | 9/2015 |
| JP | 2007107994 A | 4/2007 |
| JP | 2008241327 A | 10/2008 |
| WO | 03025534 A1 | 3/2003 |

OTHER PUBLICATIONS

WO2003025534 english translation specification. accessed from patentscope.wipo.com Oct. 21, 2021.*
International Search Report for PCT Serial No. PCT/EP2019/065117 dated Sep. 17, 2019.

* cited by examiner

PRESSURE SENSOR ARRANGEMENT

CROSS-REFERENCE TO RELATED APPLICATIONS

This application is a National Stage application of International Patent Application No. PCT/EP2019/065117, filed on Jun. 11, 2019, which claims priority to German Patent Application No. 102018114077.0 filed Jun. 13, 2018, each of which is hereby incorporated by reference in its entirety.

TECHNICAL FIELD

The present invention relates to a pressure sensor arrangement for measuring a pressure of a fluid, comprising a connector housing having a fluid opening and a fluid chamber in connection with the fluid opening, at least one pressure sensitive element, a membrane arranged between the pressure sensitive element and the fluid chamber, and pressure attenuation means.

BACKGROUND

Such a pressure sensor arrangement is used for measuring a pressure of a fluid, for example, in a hydraulic flow system.

In such flow systems, different problems caused by changes in the fluid flow can damage a pressure sensor, especially sealing membranes in oil-filled MEMS sensors or measuring membranes in thinfilm pressure sensors can be damaged. The problems causing such damages are cavitations or pressure peaks or start up fluid jets.

Sudden changes of the fluid flow in such flow systems can occur for example by closing a valve. It is well known that cavitations related to "liquid hammer" or pressure surges can result in huge pressure changes, which can cause damage to the membranes of pressure sensors. When a valve suddenly is closed, the flow medium decelerates, creating cavitations forming gas pockets. When the medium returns, it will create huge pressure changes. If these cavitations are close to a pressure sensor, the change in pressure will have the effect, that liquid will be hammered against the sensor causing possible damage to the membrane. Such effects will occur at sensor positions both before and after the closing valve.

Further, when a flow system is empty and then filled with the flow medium, start up jets can occur when the flow medium enters the empty fluid chamber of a pressure sensor with high speed. Such start up jets may damage the sensor membrane.

It is therefore known to provide some kind of protection and pressure attenuation.

U.S. Pat. No. 4,884,451 shows a pressure attenuation element consisting of a microporous sintered metal, a microporous ceramic metal, or a stainless-steel plate with at least one passing-through micro bore having a bore hole diameter of equal to or less than 0.5 mm. The micro hole prevents a too fast rise of the pressure.

Another solution is shown in U.S. Pat. No. 8,117,920 B2 in which a restriction element is provided having a nozzle with an orifice opening. The orifice opening allows propagation of pressure in the fluid chamber in a direction towards the pressure sensitive element. However, the speed of pressure changes downstream the nozzle can be limited.

A similar solution is shown in U.S. Pat. No. 8,820,168 B2 showing a device for reducing pressure pulses in pressure sensors. A nozzle element having a nozzle connects a pressure channel to a pressure sensing element.

U.S. Pat. No. 4,732,042 A shows a cast membrane protected pressure sensor in which a pressure transfer medium or material is arranged between a membrane and the pressure sensitive element.

SUMMARY

The object underlying the invention is to have a pressure sensor arrangement with a pressure pulse attenuation device which can be produced at low costs.

This object is solved with a pressure sensor arrangement as described at the outset in that the pressure attenuation means arranged in the fluid chamber in direct contact with the membrane separating the membrane from the fluid in the fluid chamber and comprise a homogenous incompressible material having a mechanical loss factor of 0.10 or higher at frequencies of 200 Hz or higher.

The loss factor which is also termed "loss angle" or "loss tangent" is a signature of the damping properties of an incompressible material. The higher the value, the more damping and vibration attenuation is provided. The mechanical loss factor is frequency dependent. In the present case the material has the mechanical loss factor of 0.1 even at higher frequencies of 200 Hz, preferably at least 500 Hz. This gives a sufficient attenuation at frequencies above 200 Hz.

In an embodiment of the invention the material has a mechanical loss factor of 0.10 or higher at frequencies of 1 kHz or higher. In this case the sufficient attenuation is achieved at frequencies above 1 kHz.

In an embodiment of the invention the material has the mechanical loss factor in a temperature range at least from −40° C. to +250° C. In this case the pressure sensor arrangement can be used in a large temperature range having still the necessary attenuation properties.

In an embodiment of the invention the material is an elastomer. The elastomer can be, for example, a rubber or silicon rubber material, like Wacker Elastosil LR 3003. Other materials having similar properties are possible as well.

In an embodiment of the invention the material comprises a shore hardness of 20 Shore A or lower.

In an embodiment of the invention the membrane is a sealing diaphragm of an oil filled MEMS sensor. A MEMS sensor or micro electronic mechanical system-sensor receives the pressure via the oil. The sealing diaphragm holds the oil in a cavity or a space in which a MEMS sensor is located. The incompressible material protects the sealing diaphragm from too large pressure pulses.

In an embodiment of the invention the membrane is a measuring membrane of a thinfilm pressure sensor element. Such a thinfilm pressure sensor element can be, for example, a piezo-resistive thinfilm resistor, which can be, for example, coupled in a Wheatstone bridge configuration. Such a thinfilm sensor in form of a thinfilm resistor can be deposited on the side of the measuring membrane facing away from the fluid chamber.

In an embodiment of the invention the membrane is part of the housing. In this case the housing has a relatively small thickness at the position of the thinfilm pressure sensor element.

In an embodiment of the invention the membrane is made of metal. The metal membrane is more sensitive to pressure peaks and can be protected by the incompressible material.

BRIEF DESCRIPTION OF THE DRAWINGS

Preferred embodiments of the invention will now be described in more detail with reference to the drawing, in which.

DETAILED DESCRIPTION

Figure 1:
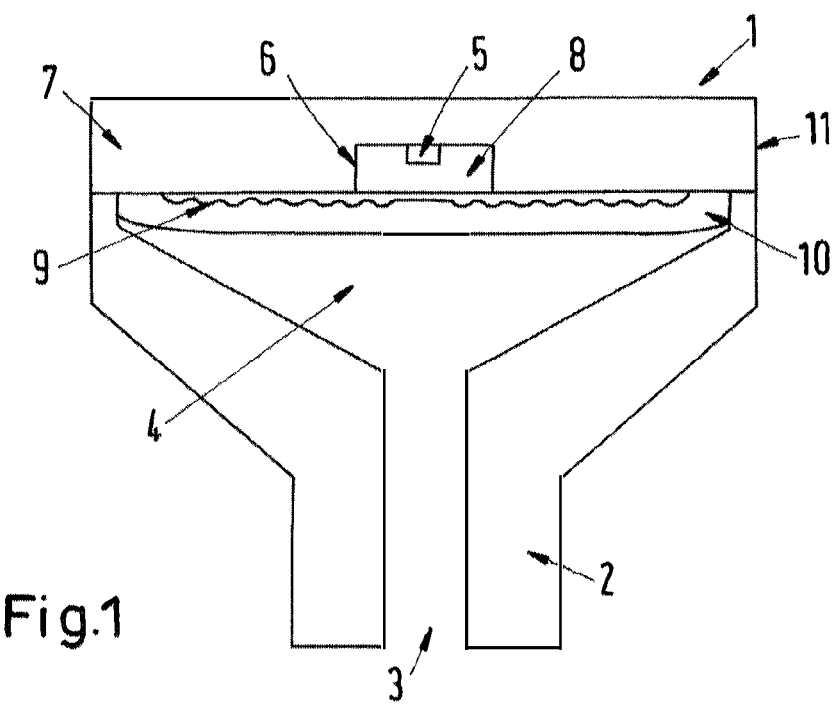
FIG. 1 shows a first embodiment of a pressure sensor.

FIG. 1 shows schematically a pressure sensor arrangement 1 comprising a connector housing 2 having a fluid opening 3 and a fluid chamber 4 in connection with the fluid opening. A pressure sensor die 5 of a MEMS sensor (micro electronic mechanical system sensor) is arranged in a recess 6 of a body part 7. The recess is filled with an oil volume 8. The oil volume 8 is sealed by means of a sealing diaphragm 9. The sealing diaphragm 9 is arranged between the pressure sensor die 5 and the fluid chamber 4.

Furthermore, pressure attenuation means 10 are arranged in the fluid chamber in direct contact with the diaphragm 9 and separates the diaphragm 9 from the fluid in the fluid chamber 4. The pressure attenuation means comprise a homogenous incompressible material having a mechanical loss factor of 0.10 or higher at frequencies of 200 Hz or higher, preferably at frequencies of 500 Hz or higher and most preferably at least 1.000 Hz or higher.

Furthermore, the material of the attenuation means 10 keeps this loss factor over a rather large temperature range which may be e.g. −40° C. t+250° C.

The material of the attenuation mean is preferably an elastomer, e.g. rubber or silicon rubber material like Wacker Elastosil LR 3003.

Furthermore, the material of the attenuation means can comprise a shore hardness of 20 Shore A or lower.

The body part 7 can be made of metal. It forms a part of a subassembly 11 comprising the pressure sensor die 5 which can have, for example, a piezo-resistive measuring bridge. The oil in the oil volume 8 protects the sensor die 5 and transfers the pressure acting on the sealing diaphragm 9 to the sensor die 5.

The attenuation means 10 on the other hand damp pressure pulses so that the diaphragm 9 is protected against damage which can be caused by a too fast increase of pressure in the fluid chamber 4.

Figure 2:
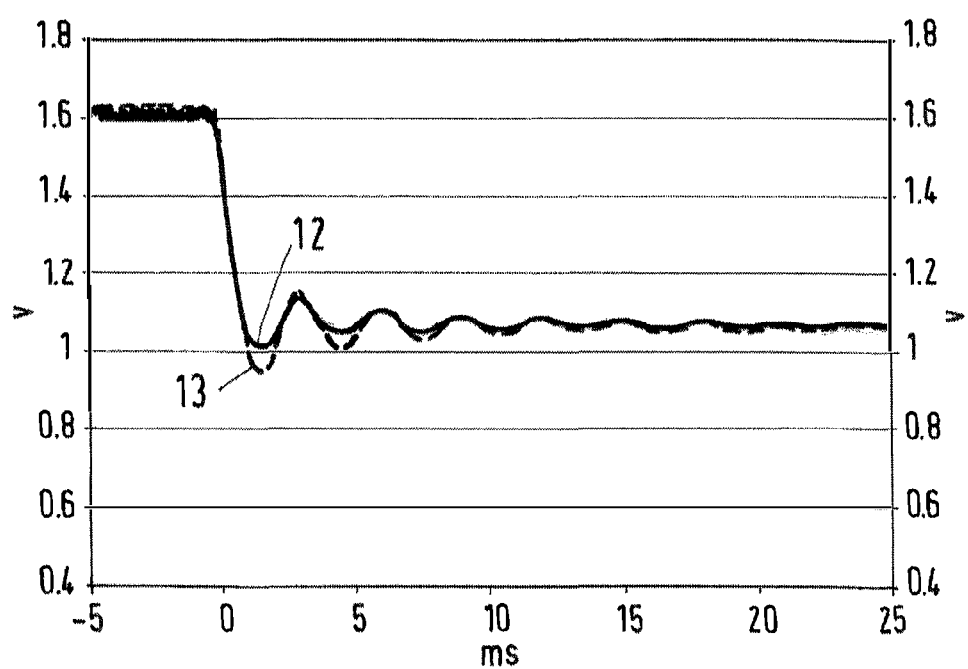
FIG. 2 shows a comparison of pressure spike attenuation with and without the incompressible material.

FIG. 2 shows a comparison of the pressure spike attenuation with and without the attenuation means 10 in form of the elastomer potting in the pressure sensor cavity, i.e. in the fluid chamber 4. A graph 12 shows a pressure spike attenuation with the attenuation means 10 of the element shown in FIG. 1. A graph 13 shows under the same conditions the pressure spike attenuation without the attenuation means 10 in the embodiment of FIG. 1.

It can be seen that the pressure spike attenuation is much faster and better with the attenuation means 10.

The material of the attenuation means 10 is applied in the fluid chamber 4 in contact to the sealing diaphragm 9. Otherwise, cavitation could occur in the fluid enclosed between the attenuation device 10 and the diaphragm 9.

The material of the attenuation means 10 transfers the fluid pressure acting on the surface the attenuation means facing the fluid chamber 4 or the fluid opening 3 to the sensing diaphragm 9 without influencing or hindering the movement of the diaphragm 9 caused by changes in fluid pressure.

Figure 3:
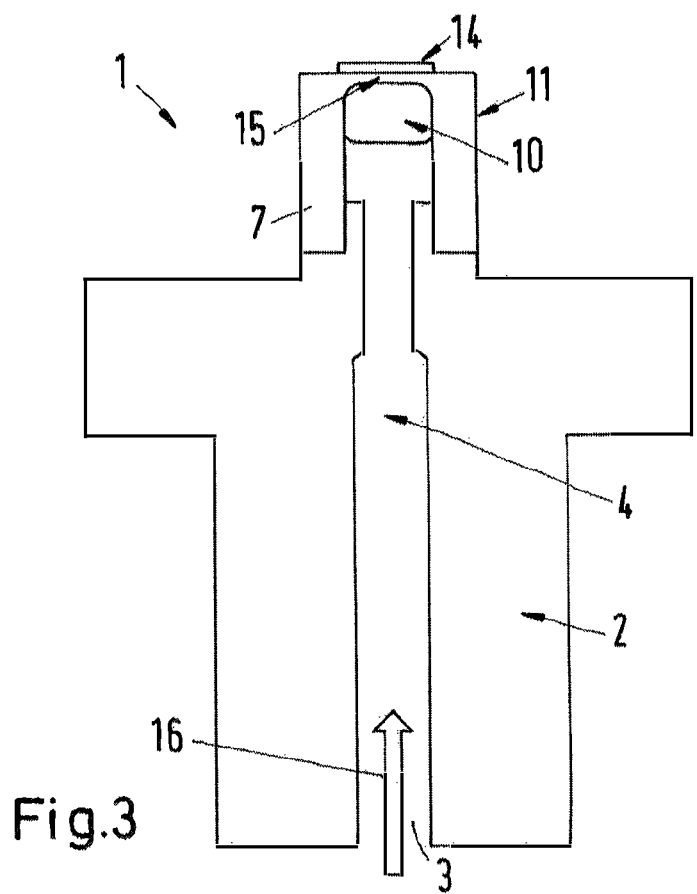
FIG. 3 shows a second embodiment of the pressure sensor arrangement.

FIG. 3 shows a second embodiment in which the same elements are denoted with the same reference numerals.

In this case the pressure sensing device 1 comprises a metallic thinfilm pressure sensor element 14 with a measuring membrane 15. The measuring membrane is part of the body part 7. The measuring membrane 15 is a wall section of the body part 7 having a rather small thickness.

The pressure sensitive elements can be formed, e.g. by piezo-resistive thinfilm resistors, which can be, e.g. coupled in a Wheatstone bridge configuration. They are deposited on the side of the measuring membrane 15 facing away from a fluid supply chamber 4.

The pressure propagation into the fluid chamber 4 is symbolized by an arrow 16.

Figure 4:
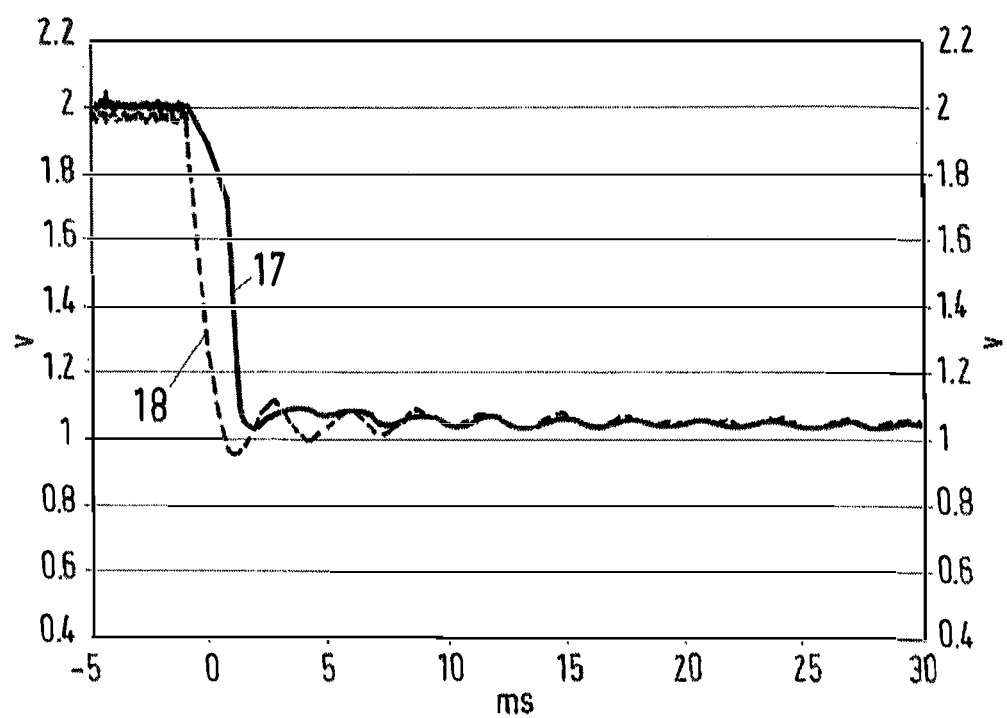
FIG. 4 shows a comparison of pressure spike attenuation with and without the incompressible material.

FIG. 4 shows the pressure spike attenuation with and without the attenuation means 10. A curve 17 shows the attenuation when the attenuation means 10 are used. A curve 18 shows the attenuation when under the same conditions the attenuation means 20 are not used.

In FIGS. 2 and 4 it can be seen that, when a sudden change of fluid pressure occurs, the attenuation means 10 reduce the occurring pressure spikes.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A pressure sensor arrangement for measuring a pressure of a fluid, comprising a connector housing having a fluid opening and a fluid chamber in connection with the fluid opening, at least one pressure sensitive element, a membrane arranged between the pressure sensitive element and the fluid chamber, and pressure attenuation means wherein the pressure attenuation means are arranged in the fluid chamber in direct contact with the membrane separating the membrane from the fluid in the fluid chamber and comprise a homogenous incompressible material having a mechanical loss factor of 0.1 or higher at frequencies of 200 Hz or higher.

2. The pressure sensor arrangement according to claim 1, wherein the material has a mechanical loss factor of 0.10 or higher at frequencies of 1 kHz or higher.

3. The pressure sensor arrangement according to claim 1, wherein the material has the mechanical loss factor in a temperature range at least from −40° C. to +250° C.

4. The pressure sensor arrangement according to claim 1, wherein the material is an elastomer.

5. The pressure sensor arrangement according to claim 1, wherein the material comprises a shore hardness of 20 Shore A or lower.

6. The pressure sensor arrangement according to claim 1, wherein the membrane is a sealing diaphragm of an oil filled MEMS sensor.

7. The pressure sensor arrangement according to claim 1, wherein the membrane is a measuring membrane of a thinfilm pressure sensor element.

8. The pressure sensor arrangement according to claim 7, wherein the membrane is part of the housing.

9. The pressure sensor arrangement according to claim 1, wherein the membrane is made of metal.

10. The pressure sensor arrangement according to claim 2, wherein the material has the mechanical loss factor in a temperature range at least from −40° C. to +250° C.

11. The pressure sensor arrangement according to claim 2, wherein the material is an elastomer.

12. The pressure sensor arrangement according to claim 3, wherein the material is an elastomer.

13. The pressure sensor arrangement according to claim 2, wherein the material comprises a shore hardness of 20 Shore A or lower.

14. The pressure sensor arrangement according to claim 3, wherein the material comprises a shore hardness of 20 Shore A or lower.

15. The pressure sensor arrangement according to claim 4, wherein the material comprises a shore hardness of 20 Shore A or lower.

16. The pressure sensor arrangement according to claim 2, wherein the membrane is a sealing diaphragm of an oil filled MEMS sensor.

17. The pressure sensor arrangement according to claim 3, wherein the membrane is a sealing diaphragm of an oil filled MEMS sensor.

18. The pressure sensor arrangement according to claim 4, wherein the membrane is a sealing diaphragm of an oil filled MEMS sensor.

19. The pressure sensor arrangement according to claim 5, wherein the membrane is a sealing diaphragm of an oil filled MEMS sensor.

\* \* \* \* \*